United States Patent

Jedvall, deceased et al.

[15] 3,705,346
[45] Dec. 5, 1972

[54] METHOD FOR MEASURING THE DISTANCE TO A LEAKAGE FAULT IN AN ELECTRICAL CONDUCTOR

[72] Inventors: Gustaf I. Jedvall, deceased, late of Stockholm, Sweden; by Arne Morgensen, administrator, Crusebjoerns Vaeg 27, S-140 30 Uttran, Sweden

[22] Filed: April 27, 1971

[21] Appl. No.: 137,910

[52] U.S. Cl. ...................................................324/52
[51] Int. Cl. ..............................................G01r 31/08
[58] Field of Search.........................................324/52

[56] References Cited

UNITED STATES PATENTS

| | | | |
|---|---|---|---|
| 1,034,609 | 8/1912 | Friendly | 324/52 |
| 1,329,432 | 2/1920 | Rogers | 324/52 |
| 2,615,076 | 10/1952 | Miller | 324/52 |
| 3,234,459 | 2/1966 | Brazee | 324/52 |

*Primary Examiner*—Gerard R. Strecker
*Attorney*—William G. Miller, Jr. and Raymond F. MacKay

[57] ABSTRACT

A bridge circuit is calibrated with specific variable resistors set in accordance with the diameter of the faulted conductor and with the temperature of the faulted conductor. The bridge circuit is then modified by shorting out the variable resistor set in accordance with the conductor diameter and by substituting a potentiometer resistor for the two sections of the bridge circuit which make up one loop across the current detector. The potentiometer contact is then adjusted to balance the bridge, and the position of that adjustment is directly calibrated in terms of distance to the fault.

1 Claim, 1 Drawing Figure

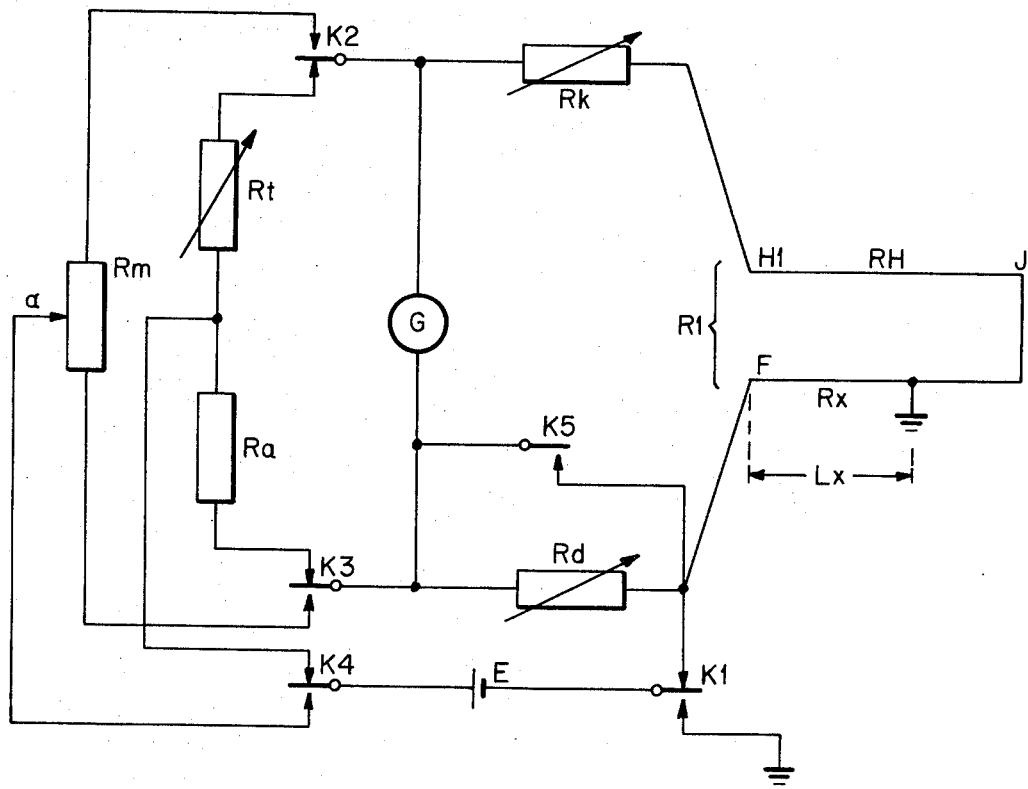

3,705,346

METHOD FOR MEASURING THE DISTANCE TO A LEAKAGE FAULT IN AN ELECTRICAL CONDUCTOR

BACKGROUND OF THE INVENTION

This invention relates to a method for measuring the absolute distance to a leakage fault in an electrical conductor of a cable and is particularly directed to the direct measurement of the distance to the fault where the cable consists of conductors which may be of different diameters and where the length of the cable is not known but the diameter and temperature of the faulted conductor is known. The leakage faults with which this invention is concerned include not only leakage between the conductor and the cable sheath (ground) but also between conductors of the cable, which conductors may have different diameters.

In the Swedish Pat. No. 204,930 as well as in the U.S. Pat. No. 1,034,609, there has been described a method for measuring an absolute distance to a leakage fault in an electrical conductor by the use of a bridge where the diameter and temperature of the wire is known. In those patents, however, there is no provision made for a separate adjustment of an element of the bridge in accordance with the temperature of the wire but instead the temperature of the wire is incorporated as a factor which is taken into account in the setting of an element of the bridge which may be adjusted to correspond with the diameter of the wire or with the type of wire. With such an arrangement it is difficult to adjust the temperature dependence and hence the accuracy of the measurement may be compromised.

SUMMARY OF THE INVENTION

This invention concerns a method for measuring with a bridge circuit the distance to a leakage fault in one of the conductors of a cable when it is connected to an unfaulted conductor at a remote point beyond the fault, the unfaulted wire acting as a transfer conductor or pilot wire. The bridge has an equipotential indicator which has a first loop across it. The first loop includes a first variable resistor set in accordance with the diameter of the faulted conductor and a serial connection of that first resistor with the faulted and the unfaulted conductors and a second variable resistor. A second loop across the indicator includes a variable third resistor set in accordance with the temperature of the faulted conductor and serially connected to a fourth resistor. The bridge also includes a current source connected between the connection point on the faulted conductor and the junction of the third and fourth resistors. The method of measuring the distance to the fault using this bridge circuit includes the adjustment of the fourth resistor to balance the bridge so that a zero indication is produced on the indicator thus calibrating the bridge. The bridge is then modified to eliminate the first resistor from the first loop and to substitute a potentiometer resistor for the third and fourth resistors as well as to connect the current source between the fault and the variable contact of the potentiometer resistor. Finally, the variable contact of the potentiometer resistor is adjusted to balance the bridge, and the position of the variable contact is then read in terms of distance to the fault.

BRIEF DESCRIPTION OF THE DRAWING

The FIGURE is a circuit diagram of the bridge showing its connection to the conductor being tested.

DESCRIPTION OF THE PREFERRED EMBODIMENT

The FIGURE shows the bridge circuit used in obtaining a measure of the distance $Lx$ by measuring the resistance $Rx$ to the leakage fault from the point of connection F. The particular fault shown is one in which there is leakage to the cable sheath and hence a leakage to ground. An unfaulted conductor J–H$l$ of the cable has a resistance RH and is connected to the faulted conductor, as for example at a terminal point J, and the bridge circuit is then connected to the two conductors at the connection points F and H$l$ across which there is a total resistance R$l$.

Initially it is necessary to utilize the bridge with the switches K1–K5 in the position shown for the purposes of calibration. With those switches positioned for calibration, the bridge consists of an equipotential indicator G, which may be a galvanometer, and a first loop connected across it, which is shown as consisting of a first variable resistor Rd in series with the faulted conductor F–J, and the unfaulted conductor J–H$l$ as well as a second variable resistor R$k$. The resistor Rd is adjusted in accordance with the diameter of the faulted conductor and may therefore be calibrated in millimeters.

The second loop around the equipotential indicator includes a third resistor Rt which is variable and is preferably set in accordance with the temperature of the faulted conductor and the serially connected resistor Ra with the connection being completed by the switches K2 and K3.

There is also provided a current source consisting of the battery E which is connected between the connection point of the faulted conductor and the junction between the third and fourth resistors through the switches K1 and K4.

To accomplish the calibration of the bridge, the second variable resistor R$k$ is adjusted until bridge balance is obtained as by an indication of a zero potential difference across the equipotential indicator G.

To make the measurement of the distance $Lx$ to the fault, the switches K1–K5 are placed in the alternate position, not shown, so that the resistor Rd is shorted and the resistors R$t$ and R$a$ are removed from the second loop of the bridge, and in their place there is substituted a potentiometer resistor Rm having a variable contact adjustable so that a variable portion $\alpha$ of the resistor is incorporated between the variable contact and that side of the equipotential indicator to which is connected the first resistor R$d$. The connection of the potentiometer resistor as the second loop is made by the switches K2 and K3 while the positioning of the switch K4 and K1 serve to connect the current source E between the fault, namely ground, and the variable contact of the potentiometer resistor.

With the connections described for measurement, adjustment of the variable contact on the potentiometer resistor is made to accomplish balance of the equipotential indicator. At that point the resistance to the fault Rx is a linear function of the portion $\alpha$ of the potentiometer resistor $Rm$ and hence the distance to the fault $Lx$ can be directly read from the calibration on the potentiometer resistor.

During the calibration adjustment the resistor $Rk$ is adjusted so that the following condition obtains in the bridge circuit:

$$Rt/Ra = (Rk + Rl)/Rd$$

whereas during measurement the adjustment of the variable contact on the potentiometer resistor to bring about balance of the bridge creates a relationship in the bridge circuit as set forth by the following equation:

$$\alpha Rm/Rm = Rx/(Rl + Rk)$$

Thus, the relationship may be expressed as follows:

$$Rx = \alpha (Rt \cdot Rd/Ra)$$

and since $Rx$ is a linear function of the distance to the fault $Lx$, the distance may be directly read from the calibration of the potentiometer resistor $Rm$.

What is claimed is:

1. A method for measuring with a bridge circuit the distance to a leakage fault in one of the conductors of a cable when it is connected to an unfaulted conductor at a remote point beyond the fault and the bridge has an equipotential indicator, a first loop across said indicator which includes a first variable resistor set in accordance with the diameter of the faulted conductor and serially connected through the faulted and the unfaulted conductors to a second variable resistor, a second loop across said indicator including a variable third resistor set in accordance with the temperature of the faulted conductor and serially connected to a fourth resistor, and a current source connected between the connection point on the faulted conductor and the junction of the third and fourth resistors; comprising the steps of adjusting said second resistor to balance the bridge so that a zero indication is produced on said indicator;

modifying said bridge to eliminate said first resistor from said first loop, substitute a potentiometer resistor for said third and fourth resistors, and connect the current source between the fault and the variable contact of the potentiometer resistor; and adjusting said variable contact to balance said bridge so that the position of the contact corresponds to the distance to the fault.

* * * * *